April 19, 1927.  M. WERTHEIMER  1,625,008
TOASTER
Filed July 29, 1926   2 Sheets-Sheet 1
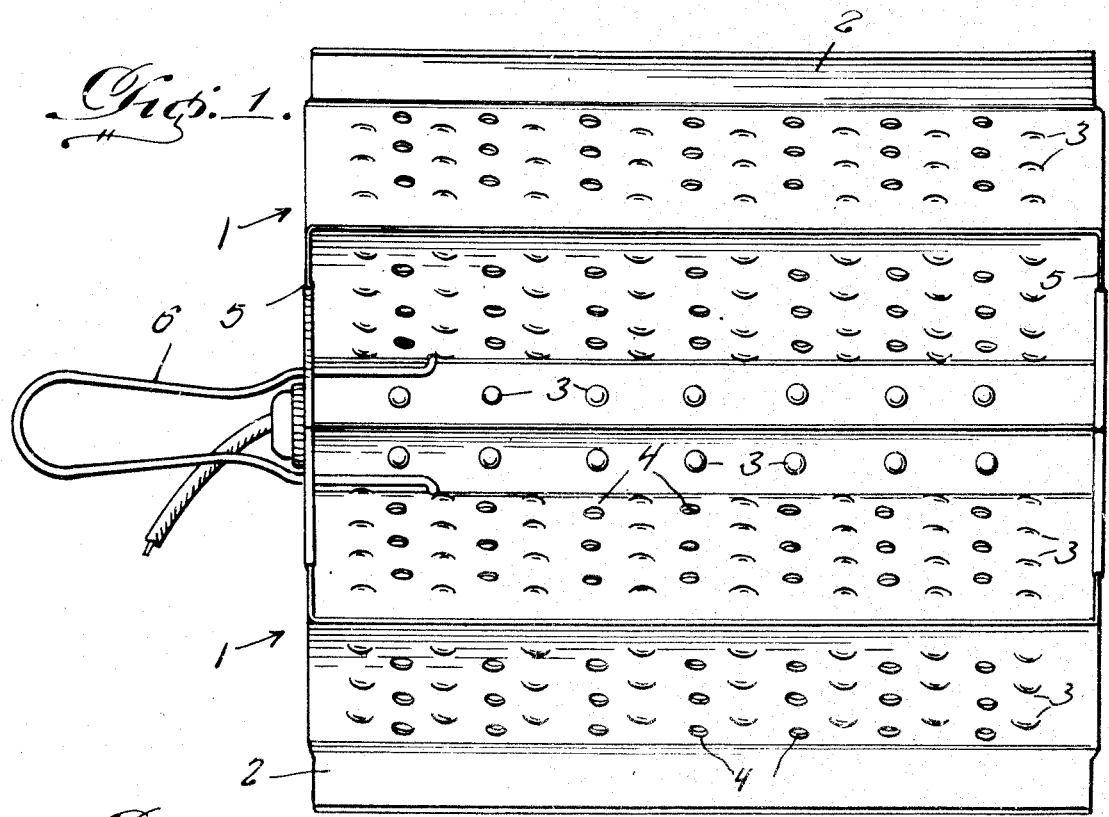
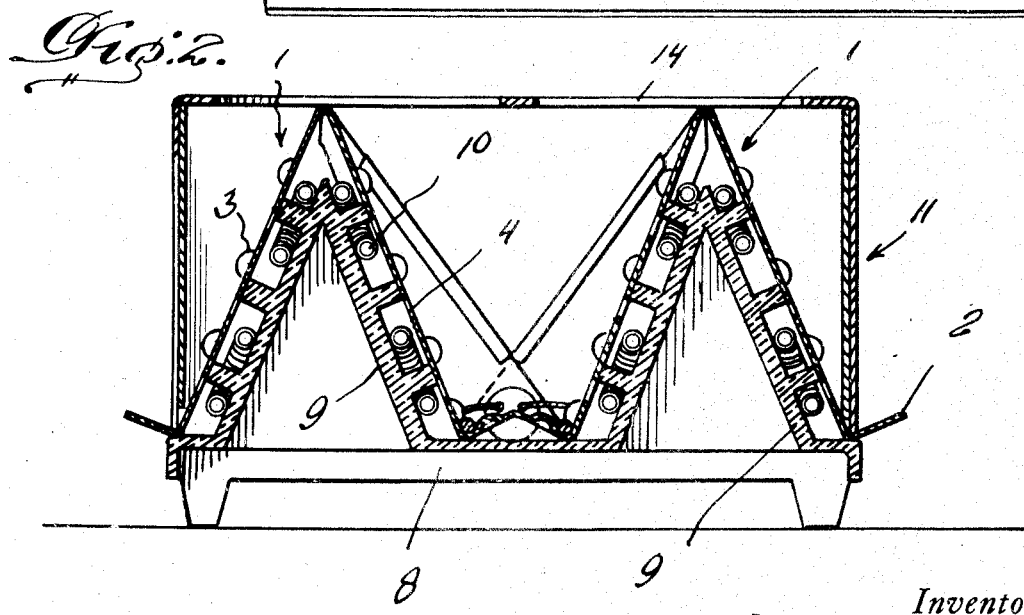
Inventor
M. Wertheimer,
By Clarence A. O'Brien
Attorney April 19, 1927.  M. WERTHEIMER  1,625,008
TOASTER
Filed July 29, 1926    2 Sheets-Sheet 2

Inventor
M. Wertheimer,
By Clarence A. O'Brien
Attorney

Patented Apr. 19, 1927.

1,625,008

UNITED STATES PATENT OFFICE.

MAX WERTHEIMER, OF CHICAGO, ILLINOIS.

TOASTER.

Application filed July 29, 1926. Serial No. 125,725.

This invention relates to an improved device for toasting bread and the like and it has reference to a structure which is usable in connection with a source of heat either from a gas burner, or electric resistance coils.

Briefly, the invention has reference to a toaster including a special stamped metal shell which is bent or formulated to provide a plurality of inclined surfaces constructed to accommodate a number of slices of bread at the same time.

One feature of the construction is the compactness and convenience of arrangement of detail which makes for simplicity and inexpensiveness of manufacture.

Other features and advantages of the invention will become apparent from the following description and drawings.

In the accompanying drawings forming a part of this application, and in which like numerals are employed to designate like parts throughout the same:

Figure 1 is a top plan view of one embodiment of the improved device.

Figure 2 is a cross section showing use of a special casing forming a housing for the shell.

Figure 3:
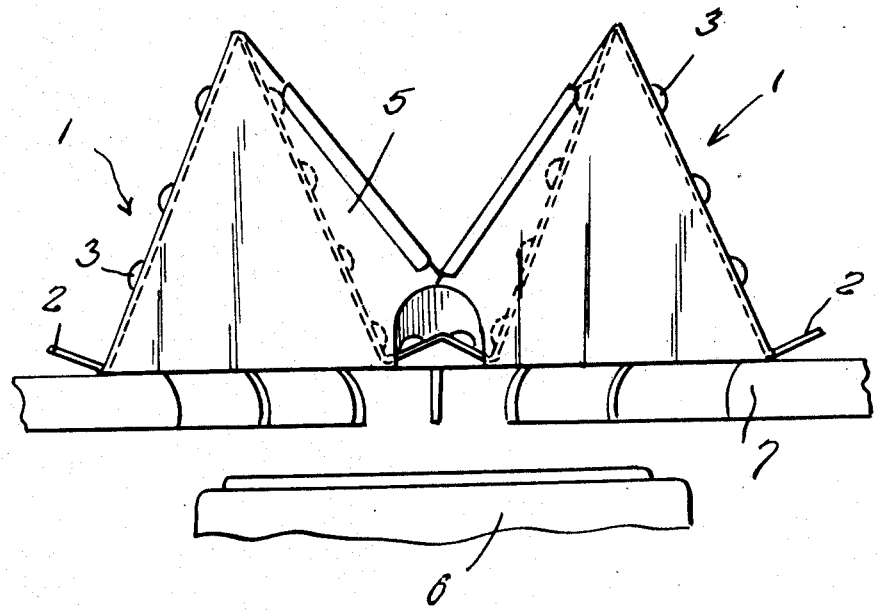
Figure 3 is an end elevation of the device used in connection with an ordinary gas stove burner.

As before stated, the invention is adapted for use either in connection with an ordinary gas stove burner, or with a special electrically operated heating element. Considering the simple form of the invention first which is used in association with the gas burner, attention is directed to Figures 1 and 3 wherein it will be seen that I provide a special metal stamping which is bent to provide a pair of spaced parallel V-shaped members 1 provided along their outer longitudinal edges with upwardly inclined ledges 2 upon which the outer pieces of the bread are rested. Each V-shaped member is adapted to accommodate two slices of bread on the outside. In addition, the inner opposed inclined surfaces accommodate two sets of additional slices of bread and in all this compact arrangement of shelves accommodate substantially eight pieces of bread of ordinary size. As shown, the inclined wall forming these members 1 are provided with outwardly pressed protuberances arranged at desired intervals, together with a multiplicity of openings, the protuberances being represented by the reference characters 3 and the openings by the reference characters 4. It will be noted that in bending the metal to form the spaced V-shaped members, portions are left to provide a pair of end walls 5 for aiding in confining the inner rows of toast in place.

As shown in Figure 1 the device is provided with a suitable handle 6 of wire or similar material. As before stated, this arrangement including the inverted V-shaped hollow members is adapted to be rested upon a gas burner 6, see Figure 3, and a complemental grid 7.

Figure 4:
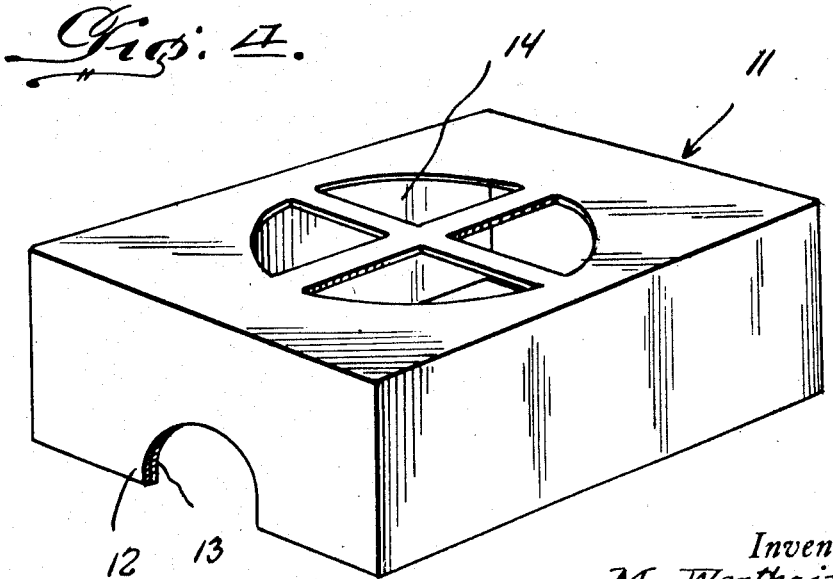
Figure 4 is a perspective view of the casing removed.

As before indicated, the device is also adaptable for use in connection with a special electrical heating unit. By directing attention to Figure 2 it will be seen that the heating unit comprises a base 8 having a pair of upstanding V-shaped uprights 9, the external faces of which are provided with channels or recesses for accommodating electrical resistance elements 10. In this arrangement the double-V shell is simply struck down over this correspondingly shaped electrical heating unit and the heat waves escape through the holes and act on the toast in somewhat the same way as the gas burner construction. It might also be stated that in some instances a special casing 11 is provided, the same being adapted to rest upon the ledges 2 as shown in Figure 2 to aid in confining the heat and to insure more rapid toasting. The casing is composed of a pair of telescopically connected members 12 and 13, the outer member 12 being provided in its top with an opening 14 of the design shown in Figure 4.

It is believed that by considering the description in connection with the drawing a clear comprehension of the invention and its use will be had. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In a toaster of the class described, a heating unit comprising a base including a pair of spaced upstanding V-shaped elements having their external faces formed with recesses, electrical resistance coils located in said recesses, a shell including a pair of V-shaped members fitting over said elements, said shell having its downwardly inclined walls formed with a plurality of heat passages and intervening outstanding protuberances.

2. In a toaster of the class described, a heating unit comprising a base including a pair of upstanding spaced V-shaped heating elements, a separate heat confining shell telescopically down upon and over said elements, said shell embodying a pair of V-shaped portions corresponding to the heating elements, the outer walls of said shell being provided with outstanding ledges, and a separate removable casing fitted down over said shell and resting upon said ledges, said casing having an opening in its top.

In testimony whereof I affix my signature.

MAX WERTHEIMER.